US009247562B2

(12) United States Patent
Kim et al.

(10) Patent No.: US 9,247,562 B2
(45) Date of Patent: Jan. 26, 2016

(54) METHOD AND DEVICE FOR SENDING DATA VIA CROSS-CARRIER SCHEDULING IN WIRELESS COMMUNICATION SYSTEM SUPPORTING PLURALITY OF COMPONENT CARRIERS

(75) Inventors: Soyeon Kim, Gyeonggi-Do (KR); Jaehoon Chung, Gyeonggi-Do (KR)

(73) Assignee: LG ELECTRONICS INC., Seoul (KR)

(\*) Notice: Subject to any disclaimer, the term of this patent is extended or adjusted under 35 U.S.C. 154(b) by 492 days.

(21) Appl. No.: 13/519,764

(22) PCT Filed: Jan. 6, 2011

(86) PCT No.: PCT/KR2011/000087
§ 371 (c)(1),
(2), (4) Date: Aug. 27, 2012

(87) PCT Pub. No.: WO2011/083990
PCT Pub. Date: Jul. 14, 2011

(65) Prior Publication Data
US 2012/0320840 A1 Dec. 20, 2012

Related U.S. Application Data

(60) Provisional application No. 61/292,501, filed on Jan. 6, 2010.

(30) Foreign Application Priority Data

Jan. 5, 2011 (KR) .......................... 10-2011-0000826

(51) Int. Cl.
*H04W 72/12* (2009.01)
*H04L 5/00* (2006.01)

(52) U.S. Cl.
CPC ........... *H04W 72/1263* (2013.01); *H04L 5/001* (2013.01); *H04L 5/0053* (2013.01); *H04L 5/0094* (2013.01)

(58) Field of Classification Search
CPC ..... H04L 5/0053; H04L 5/001; H04L 5/0055; H04L 1/1861; H04W 72/042
See application file for complete search history.

(56) References Cited

U.S. PATENT DOCUMENTS

| 2007/0258540 | A1 | 11/2007 | Ratasuk et al. |
| 2010/0142461 | A1 | 6/2010 | Miki et al. |
| 2010/0238870 | A1 | 9/2010 | Mitra et al. |
| 2011/0085513 | A1* | 4/2011 | Chen et al. .................... 370/330 |

(Continued)

FOREIGN PATENT DOCUMENTS

| KR | 10-2009-0024272 A | 3/2009 |
| KR | 10-2009-0027614 A | 3/2009 |
| KR | 10-2009-0121368 A | 11/2009 |

*Primary Examiner* — Jung Park
(74) *Attorney, Agent, or Firm* — Birch, Stewart, Kolasch & Birch, LLP

(57) ABSTRACT

In a method of operating a user equipment (UE) for transmitting a data burst through cross-carrier scheduling in a system supporting a plurality of component carriers, downlink control information (DCI) containing a carrier indicator field (CIF) is received from a base station (BS), through a physical downlink control channel (PDCCH) in a control region within a subframe. A downlink component carrier indicated by the CIF is identified, and an uplink component carrier linked with the identified downlink component carrier is then determined. An uplink data burst is transmitted to the BS through the determined uplink component carrier.

6 Claims, 16 Drawing Sheets

(56) References Cited

U.S. PATENT DOCUMENTS

2011/0126068 A1* 5/2011 Lee et al. .................... 714/748
2012/0009923 A1* 1/2012 Chen et al. .................... 455/434
2014/0269585 A1* 9/2014 Earnshaw et al. ............. 370/329

* cited by examiner (a)

(b)

METHOD AND DEVICE FOR SENDING DATA VIA CROSS-CARRIER SCHEDULING IN WIRELESS COMMUNICATION SYSTEM SUPPORTING PLURALITY OF COMPONENT CARRIERS

CROSS REFERENCE TO RELATED APPLICATIONS

This application is the National Phase of PCT/KR2011/000087 field on Jan. 6, 2011, which claims priority under 35 U.S.C. 119(e) to U.S. Provisional Application No. 61/292,501 filed on Jan. 6, 2010, and under 35 U.S.C. 119(a) to Patent Application No. 10-2011-0000826 filed in the Republic of Korea on Jan. 5, 2011, all of which are hereby expressly incorporated by reference into the present application.

TECHNICAL FIELD

The present disclosure relates to radio communication, and more particularly, to a method for transmitting data through cross-carrier scheduling in a radio communication system supporting a plurality of component carriers and a user equipment using the method.

BACKGROUND ART

3rd generation partnership project (3GPP) long term evolution (hereinafter, referred to as 'LTE') and LTE-advanced (hereinafter, referred to as 'LTE-A') communication systems will be schematically described as examples of mobile communication systems applicable to the present disclosure.

One or more cells exist in one base station. One cell is set to one of bandwidths of 1.25 MHz, 2.5 MHz, 5 MHz, 10 MHz, 15 MHz and 20 MHz with respect to one carrier so as to provide a downlink/uplink transmission service to several user equipments (UEs). In this case, different cells may be set to provide different bandwidths. One base station controls data transmission/reception for a plurality of UEs. The base station transmits downlink (DL) scheduling information of DL data to a corresponding UE so as to inform the corresponding UE of information related to time/frequency domains to which data is to be transmitted, encoding, data size, hybrid automatic repeat request (HARQ), etc. The base station transmits uplink (UL) scheduling information of UL data to the corresponding UE so as to inform the corresponding UE of information related to time/frequency domains that can be used by the corresponding UE, encoding, data size, HARQ, etc. An interface for transmitting user traffic or control traffic may be used between base stations.

Although radio communication technology has been developed up to LTE based on wiideband code division multiple access (WCDMA), the demands and expectations of users and providers continue to increase. Since other radio access technologies have also been continuously developed, new technology evolution is required to secure high competitiveness in the future. The new technology requires decrease in cost per bit, increase in service availability, flexible use of a frequency band, simple structure, open interface, suitable UE power consumption, etc.

Recently, the standardization of the subsequent technology of the LTE is ongoing in the 3GPP. In this specification, the technology is called as 'LTE-A.' The LTE and LTE-A systems are different from each other in terms of system bandwidths and introduction of relays.

The LTE-A system aims to support a wideband of a maximum of 100 MHz. To this end, the LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each of the frequency blocks is transmitted using a component carrier.

As the carrier aggregation technology is used in the LTE-A system that is a next-generation communication system, it is required to develop a method in which a UE receives a signal from a base station or relay in a system supporting a plurality of carriers.

DISCLOSURE OF THE INVENTION

Therefore, an object of the present disclosure is to provide a method and apparatus for transmitting data by determining an uplink component carrier cross-carrier scheduled using a carrier indicator field (CIF) contained in downlink control information (DCI).

To achieve these and other advantages and in accordance with the purpose of the present disclosure, as embodied and broadly described herein, there is provided a method of operating a user equipment (UE) for transmitting a data burst through cross-carrier scheduling in a system supporting a plurality of component carriers, the method including: receiving downlink control information (DCI) containing a carrier indicator field (CIF) from a base station (BS), through a physical downlink control channel (PDCCH) in a control region within a subframe; identifying a downlink component carrier indicated by the CIF and then determining an uplink component carrier linked with the identified downlink component carrier; and transmitting an uplink data burst to the BS through the determined uplink component carrier.

The CIF may be an index value indicating each of the component carriers according to the component carrier configuration assigned to the UE.

The CIF may be an index value indicating the downlink component carrier.

The DCI may be downlink scheduling assignment containing downlink resource assignment information or uplink grant containing uplink resource assignment information.

The identified downlink component carrier may be a downlink component carrier linked with at least one uplink component carrier.

The CIF may be expressed by 3 bits.

To achieve the above aspect of the present disclosure, there is provided a UE for transmitting a data burst through cross-carrier scheduling in a system supporting a plurality of component carriers, the UE including: a radio frequency (RF) unit transmitting and receiving radio signals; and a control unit connected to the RF unit, wherein the control unit controls the RF unit to receive DCI containing a CIF from a BS, through a PDCCH in a control region within a subframe, identifies a downlink component carrier indicated by the CIF and then determines an uplink component carrier linked with the identified downlink component carrier, and controls the RF unit to transmit an uplink data burst to the BS through the determined uplink component carrier.

As described above, according to the present disclosure, all UEs can be scheduled using a CIF with a fixed size, by using a UE-specific CIF, i.e., by indexing component carriers according to the configuration of the component carriers assigned to each of the UEs and indicating the indexed values to the CIF.

It should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

FIG. 3 (b) is a diagram illustrating the structure of an uplink subframe used in the 3GPP LTE system;

FIG. 14 (b) is a diagram illustrating a UE-specific CIF configuration method according to an embodiment of the present disclosure.

MODES FOR CARRYING OUT THE PREFERRED EMBODIMENTS

Figure 1:
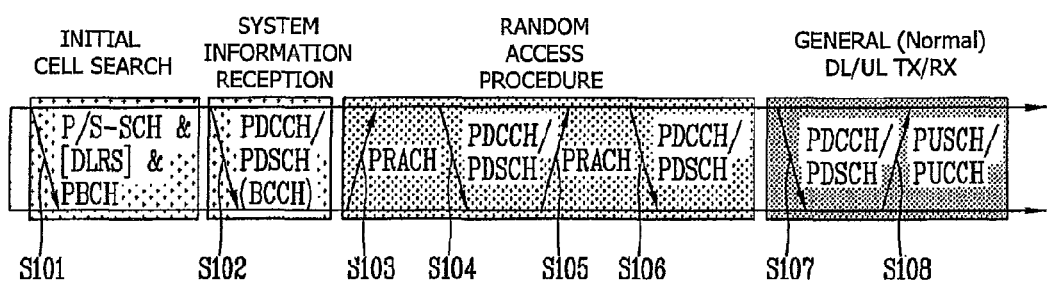
FIG. 1 is a diagram illustrating physical channels used in a 3GPP LTE system and a general signal transmission method using the physical channels.

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

For example, although a case in which mobile communication systems of the present disclosure are 3GPP LED and LTE-A systems will be described in detail, the present disclosure may be applied to other mobile communication systems, except some specific items of the 3GPP LTE and LTE-A systems.

To prevent ambiguity in the concept of the present invention, structures and apparatuses of the known art will be omitted, or will be shown in the form of a block diagram based on main functions of each structure and apparatus. Like reference numerals indicate like elements throughout the specification and drawings.

In the following descriptions, it is assumed that the term "terminal" is generally called as a mobile or stationary user device such as a user equipment UE, mobile station (MS) or advanced mobile station (AMS). Also, it is assumed that the term "base station" is generally called as an arbitrary node in a network communicating with the terminal, such as a Node B, eNode B, base station (BS) or access point (AP). The term "relay" may be called as relay node (RN), a relay station (RS), etc.

In the mobile communication system, the UE or relay may receive information from the BS through a downlink (DL), and may transmit information to the BS through an uplink (UL). Data and various control information are used as the information transmitted or received by the UE or relay, and various physical channels exist according to the kind and usage of the information transmitted or received by the UE or relay.

Description will now be given in detail of a method and apparatus for transmitting data through cross-carrier scheduling in a radio communication system supporting a plurality of component carriers, with reference to the accompanying drawings.

FIG. 1 is a diagram illustrating physical channels used in a 3GPP LTE system and a general signal transmission method using the physical channels.

A UE performs an initial cell search operation such as synchronization with a BS when the UE is powered on or enters a new cell (S101). To this end, the UE may receive a primary synchronization channel (P-SCH) and a secondary synchronization channel (S-SCH) from the BS so as to be synchronized with the BS, and acquire information such as cell ID. Then, the UE may receive a physical broadcast channel from the BS so as to acquire broadcast information in the cell. In the initial cell search, the UE may receive a downlink reference signal (DL RS) so as to check a DL channel state.

The UE which completes the initial cell search may acquire more detailed system information by receiving a physical downlink control channel (PDCCH) and a physical downlink shared channel (PDSCH) according to information contained in the PDCCH (S102).

Meanwhile, if the UE initially accesses the BS or has no radio resource for signal transmission, the UE may perform a random access procedure for the BS (S103 to S106). To this end, the UE may transmit a specific sequence as a preamble through a physical random access channel (PRACH) (S103 and S105) and receive a response message to the preamble through the PDCCH and corresponding PDSCH (S104 and S106). In the case of competition-based RACH, a contention resolution procedure may be additionally performed.

The UE which has performed the procedure described above may receive a PDCCH/PDSCH (S107) and transmit a physical uplink shared channel (PUSCH)/physical uplink control channel (PUCCH) (S108) as a normal UL/DL signal transmission procedure. The information transmitted from the UE to the BS through an UL or transmitted from the BS to the UE includes a DL/UL acknowledgement (ACK)/nonacknowledgement (NACK) signal, a channel quality indicator (CQI), a precoding matrix index (PMI), a rank indicator (RI), etc.

Figure 2:
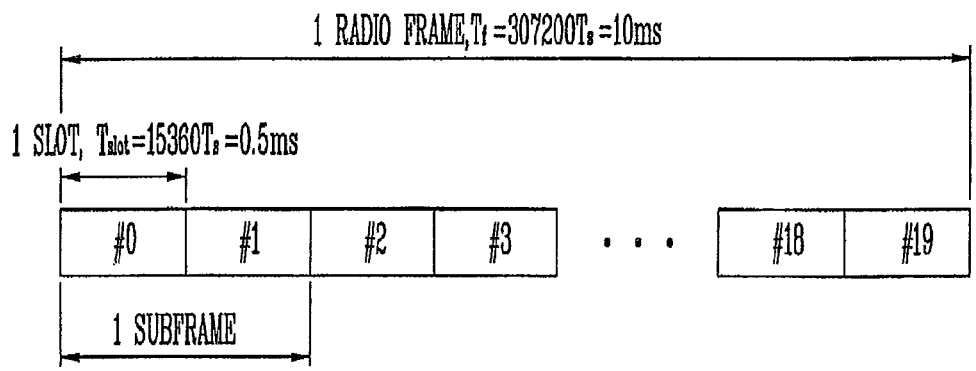
FIG. 2 is a diagram illustrating the structure of a radio frame used in the 3GPP LTE system.

FIG. 2 is a diagram illustrating the structure of a radio frame used in the 3GPP LTE system.

Referring to FIG. 2, one radio frame has a length of 10 ms ($327200T_s$) and consists of ten subframes having an equal size. Each of the subframes has a length of 1 ms and is composed of two slots. Each of the slots has a length of 0.5 ms ($15360T_s$). Here, $T_s$ denotes a sampling time and is represented by $T_s=1/(15\text{ kHz}\times2048)=3.1552\times10^{-8}$ (about 33 ns). The slot includes a plurality of orthogonal frequency division multiplexing (OFDM) or single carrier-frequency division multiple access (SC-FDMA) symbols in the time domain and includes a plurality of resource blocks in the frequency domain.

In the LTE system, one resource block (RB) includes 12 subcarriers×7(6) OFDM or SC-FDMA symbols. A transmission time interval (TTI) that is a unit time for which data is transmitted may be determined in a unit of one or more subframes. The aforementioned structure of the radio frame is merely exemplary, and the number of subframes included in the radio frame, the number of slots included in each of the subframes and the number of OFDM or SC-FDMA symbols included in each of the slots may be variously changed.

Figure 3:
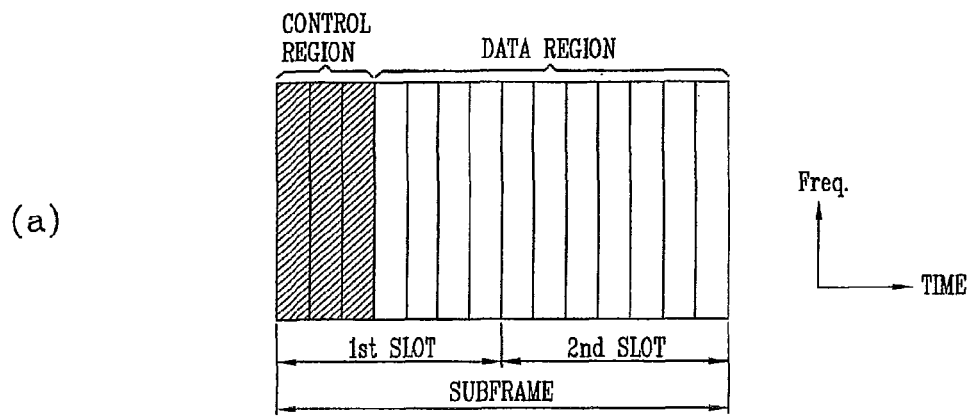
FIG. 3 (a) is a diagram illustrating the structure of a downlink subframe used in the 3GPP LTE system.
Figure 3:
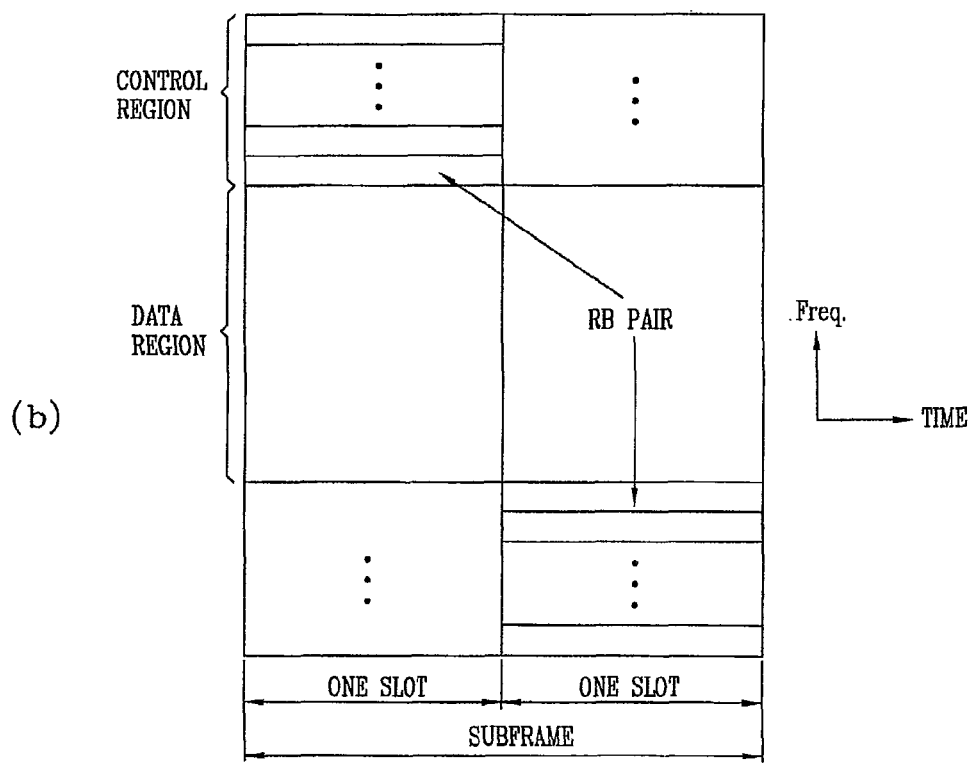

FIG. 3 is a diagram illustrating the structures of DL and UL subframes used in the 3GPP LTE system.

Referring to 3 (*a*), one DL subframe includes two slots in the time domain. A maximum of three OFDM symbols prior to a first slot in the DL subframe become a control region in which control channels are assigned, and the other OFDM symbols become a data region in which PDSCHs are assigned.

The DL control channels used in the 3GPP LTE system, etc. includes a physical control format indicator channel (PCFICH), a physical downlink control channel (PDCCH), a physical hybrid-ARQ indicator channel (PHICH), etc. The PCFICH transmitted in a first OFDM symbol of the subframe carries information on the number of OFDM symbols (i.e., the size of the control region) used in the transmission of control channels in the subframe. The control information transmitted through the PDCCH is referred to as downlink control information (DCI). The DCI indicates UL resource assignment information, DL resource assignment information, UL transmission power control commands for arbitrary UE groups, etc. The PICH carries an ACK/NACK signal for a hybrid automatic repeat request (HARQ). That is, the ACK/NACK signal for UL data transmitted by the UE is transmitted on the PHICH.

Hereinafter, the PDCCH that is a DL physical channel will be described in brief. The PDCCH will be described in detail later with reference to FIGS. 5 to 8.

A BS may transmit, through the PDCCH, resource assignment and transmission format of PDSCH (this is also referred to as DL grant), resource assignment information of PUSCH (this is also referred to as UL grant), an arbitrary UE, a set of power control commands for individual UEs in a group, activation of a voice over Internet protocol (VoIP), etc. A plurality of PDCCHs may be transmitted in the control region, and a UE may monitor the plurality of PDCCHs. The PDCCH is configured as an aggregation of one or some continuous control charge elements (CCEs).

The PDCCH configured as the aggregation of one or some continuous CCEs may be subjected to subblock interleaving and then transmitted through the control region. The CCE is a logical assignment unit used to provide a code rate according to the status of a radio channel to the PDCCH. The CCE corresponds to a plurality of resource element groups. The format of the PDCCH and the number of available bits of the PDCCH are determined according to the correlation between the number of CCEs and the code rate provided by the CCEs.

The control information transmitted through the PDCCH is referred to as DCI. The following Table 1 shows DCI according to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource assignment information, and DCI formats 1 to 2 indicate DL resource assignment information. DCI formats 3 and 3A indicate UL transmit power control (TPC) commands for arbitrary UE groups.

A scheme of mapping resources for a BS to transmit PDCCH in the LTE system will be described in brief.

In general, a BS may transmit scheduling assignment information and other control information through PDCCH. A physical control channel may be transmitted to one aggregation or a plurality of continuous CCEs. One CCE includes 9 resource element groups (REGs). The number of REGs unassigned to a physical control format indicator channel (PCFICH) or physical hybrid automatic repeat request indicator channel (PHICH) is $N_{REG}$. The CCE that can be used in the system is 0 to $N_{CCE}-1$ (here, $N_{CCE}=\lfloor N_{REG}/9 \rfloor$). The PDCCH supports multiple formats as shown in the following Table 2. One PDCCH configured with n continuous CCEs starts from CCE performing i mode n=0 (here, i is a CCE number). The multiple PDCCHs may be transmitted in one subframe.

TABLE 2

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 3 | 36 | 288 |
| 3 | 4 | 72 | 576 |

Referring to Table 2, a BS may determine a PDCCH format according to how many regions the BS is to transmit control information, etc. A UE may reduce overhead by reading control information, etc. in the unit of CCE. Similarly, a relay may also read control information, etc. in the unit of R-CCE. In the LTE-A system, resource elements (REs) may be mapped in the unit of relay-control channel element (R-CCE) so as to transmit R-PDCCH for an arbitrary relay.

Referring to FIG. 3 (*b*), the UL subframe may be divided into a control region and a data region in the frequency domain. The control region is assigned to PUCCH carrying UL control information. The data region is assigned to PUSCH carrying user data. To maintain properties of a single carrier, one UE does not transmit the PUCCH and PUSCH at the same time. The PUCCH for one UE is assigned to an RB pair in one subframe. RBs belonging to the RB pair occupy different subcarriers in two slots, respectively. The RB pair assigned to the PUCCH is frequency-hopped at a slot boundary.

Figure 4:
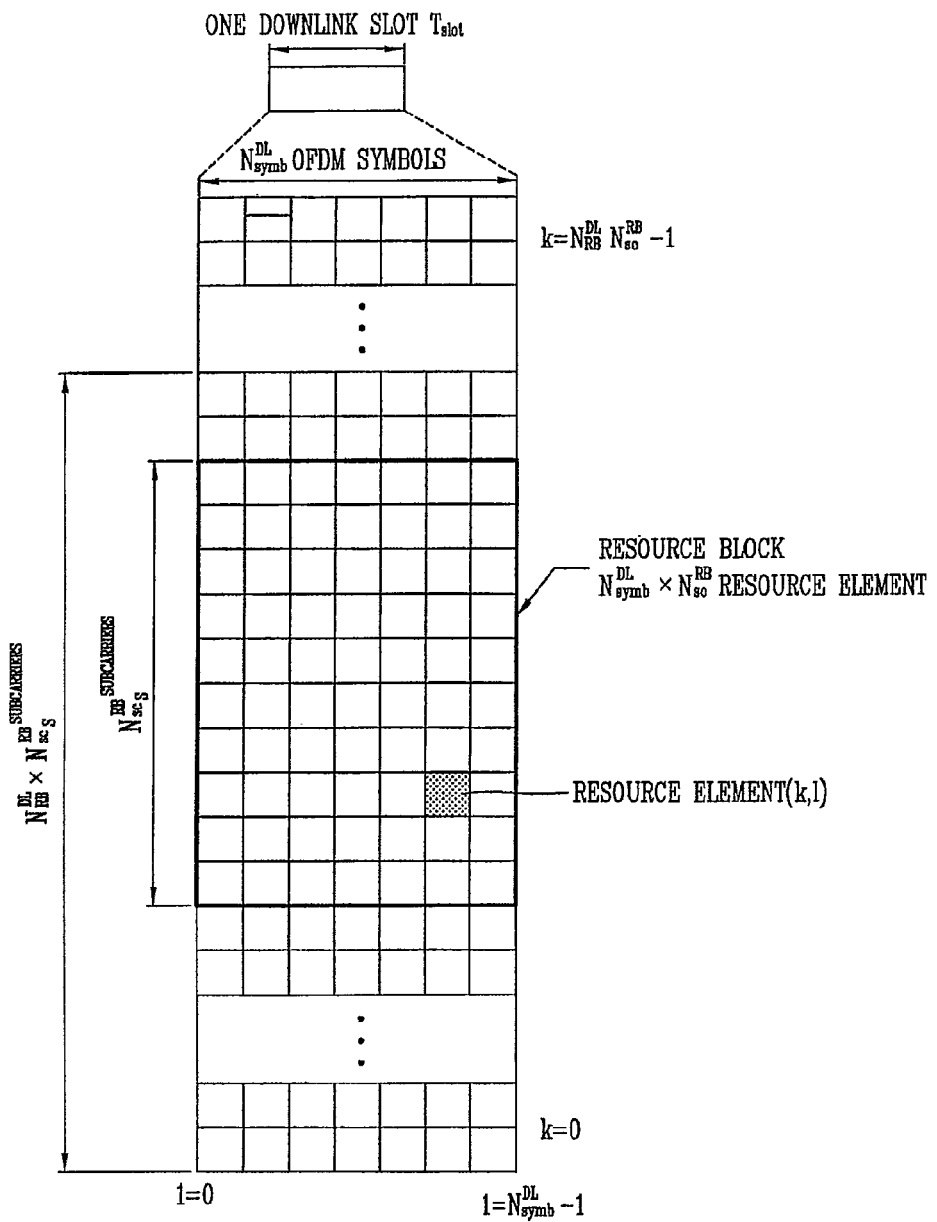
FIG. 4 is a diagram illustrating a time-frequency resource grid structure of a downlink used in the 3GPP LTE system.

FIG. 4 is a diagram illustrating a time-frequency resource grid structure of a downlink used in the 3GPP LTE system.

A DL signal transmitted in each of the slots uses a resource grid structure configured with $N_{RB}^{DL} \times N_{SC}^{RB}$ subcarriers and $N_{symb}^{DL}$ OFDM symbols. Here, $N_{RB}^{DL}$ denotes the number of RBs in a DL, $N_{SC}^{RB}$ denotes the number of subcarriers constituting one RB, and $N_{symb}^{DL}$ denotes the number of OFDM symbols in one DL slot. The size of $N_{RB}^{DL}$ is changed depending on the transmission bandwidth of the DL configured in a cell, and must satisfy $N_{RB}^{min,DL} \leq N_{RB}^{DL} \leq N_{RB}^{max,DL}$. Here, $N_{RB}^{min,DL}$ denotes the smallest DL bandwidth supported in the radio communication system, and $N_{RB}^{max,DL}$ denotes the greatest DL bandwidth supported in the radio communication system. Although $N_{RB}^{min,DL}=6$ and $N_{RB}^{max,DL}=110$, the present disclosure is not limited thereto. The number of OFDM symbols included in one slot may be changed depending on the length of a cyclic prefix (CP) and the interval between subcarriers. In the case of multi-antenna transmission, one resource grid may be defined per antenna port.

Each element in the resource grid for each antenna port is called as a resource element (RE), and is uniquely identified by an index pair (k, l). Here, k denotes an index in the frequency domain, and l denotes an index in the time domain. The k has the value of any one of $0, \ldots, N_{RB}^{DL} N_{SC}^{RB}-1$, and the l has the value of any one of $0, \ldots, N_{symb}^{DL}-1$.

The resource block shown in FIG. 4 is used to describe the mapping relationship between a physical channel and REs. The RB may be divided into a physical resource block (PRB) and a virtual resource block (VRB). One PRB is defined by continuous $N_{symb}^{DL}$ OFDM symbols in the time domain and $N_{SC}^{RB}$ continuous subcarriers in the frequency domain. Here, the $N_{symb}^{DL}$ and $N_{SC}^{RB}$ may be predetermined values. For example, the $N_{RB}^{DL}$ and may be given as shown in the following Table 3. Therefore, the one PRB is configured with $N_{symb}^{DL} \times N_{SC}^{RB}$ REs. Although the one PRB may be correspond to one slot in the time domain and correspond to 180 kHz in the frequency domain, the present disclosure is not limited thereto.

TABLE 3

| Configuration | | $N_{SG}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value of 0 to $N_{RB}^{DL}-1$ in the frequency domain. The relationship between a PRB number nPRB in the frequency domain and the REs (k, l) in one slot satisfies $$n_{PRB} = \left\lfloor \frac{k}{N_{SC}^{RB}} \right\rfloor.$$

The size of the VRB is identical to that of the PRB. The VRB may be divided into a localized VRB (LVRB) and a distributed VRB (DVRB). For each type of VRB, a pair of VRBs existing in two slots within one subframe is assigned together with a number $n_{VRB}$.

The VRB and the PRB have the same size. Two types of VRBs are defined: a first type of VRB is the LVRB and a second type of VRB is the DVRB. For each type of VRB, a pair of VRBs has a single VRB index (hereinafter, referred to as a VBR number), and is assigned through two slots within one subframe. In other words, any one of 0 to $N_{RB}^{DL}-1$ indices is assigned to each of the $N_{RB}^{DL}$ VRBs belonging to a first slot of the two slots constituting the one subframe, and any one of 0 to indices is also assigned to each of the $N_{RB}^{DL}$ VRBs belonging to a second slot of the two slots.

As described above, the structure of the radio frame, the DL and UL subframes, the time-frequency resource grid structure of the DL, etc., which are described in FIGS. 2 to 4, may also be applied between the BS and the relay.

Hereinafter, a procedure in which the BS perform downlink transmission of PDCCH to the UE in the LTE system.

Figure 5:
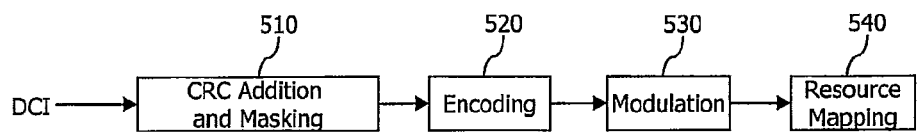
FIG. 5 is a block diagram illustrating the configuration of a physical downlink control channel (PDCCH)

FIG. 5 is a block diagram illustrating the configuration of PDCCH.

After the BS determines a PDCCH format according to the DCI to be downlink transmitted to the UE, the BS adds a cyclic redundancy check (CRC) to the DCI, and masks a unique identifier (this is referred to as a radio network temporary identifier (RNTI)) to the CRC according to the owner or usage of the PDCCH (510).

If the PDCCH is a PDCCH for a specific UE, a unique identifier of the UE, e.g., a cell-RNTI (C-RNTI) may be masked to the CRC. Alternatively, if the PDCCH is a PDCCH for a paging message, a paging indicator identifier, e.g., a paging-RNTI (P-RNTI) may be masked to the CRC. If the PDCCH is a PDCCH for system information, a system information identifier, e.g., a system information-RNTI (SI-RNTI) may be masked to the CRC. A random access-RNTI (RA-RNTI) may be masked to the CRC so as to indicate a random access response that is a response to the transmission of an access preamble of the UE. A transmit power control-RNTI (TPC-RNTI) may be masked to the CRC so as to indicate a TPC command to a plurality of UEs.

If the C-RNTI is used, the PDCCH carries control information for a corresponding specific UE (this is referred to as UE-specific control information). If another RNTI is used, the PDCCH carries common control information received to all or a plurality of UEs in the cell.

The CRC generates coded data by encoding the DCI (520). The encoding includes channel encoding and rate matching.

The coded data is modulated to generate modulation symbols (530).

The modulation symbols are mapped to PREs (540). Each of the modulation symbols is mapped to the RE.

Figure 6:
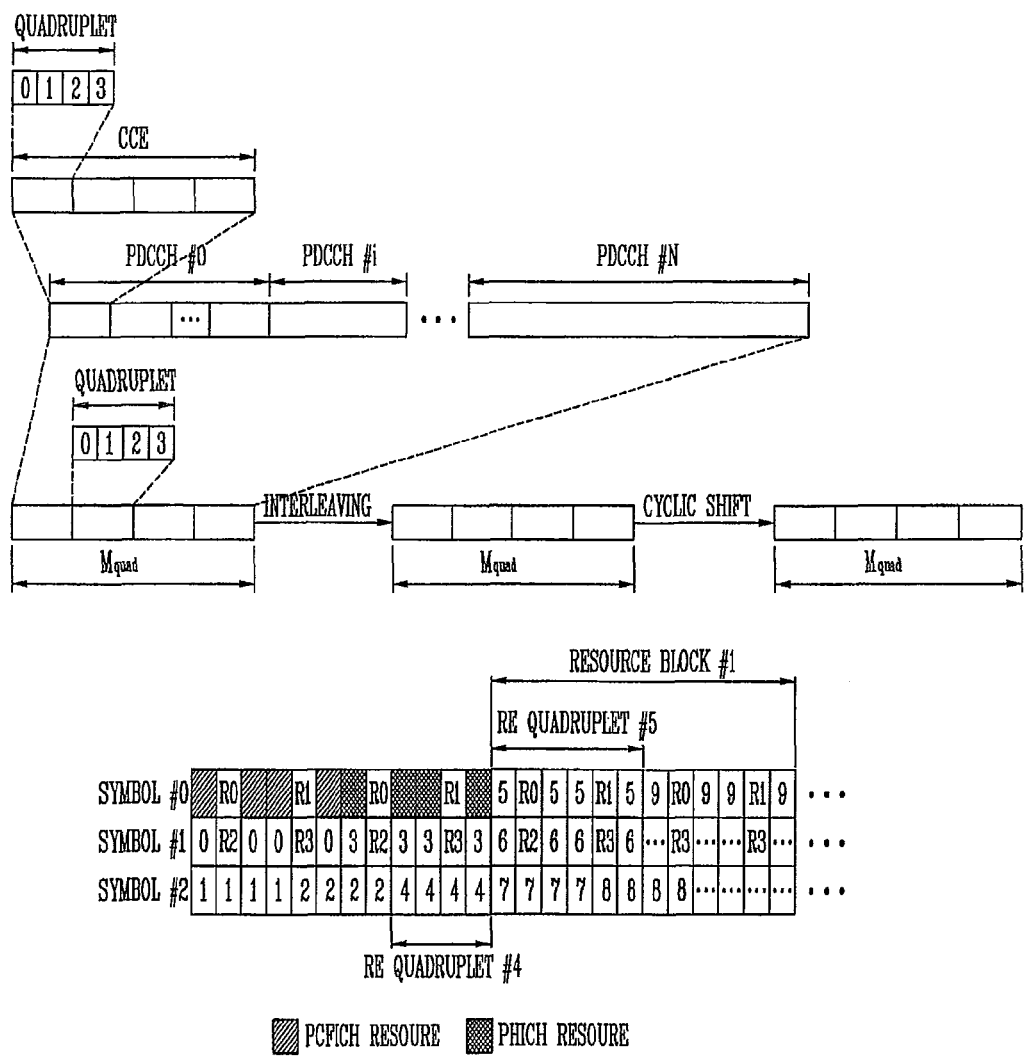
FIG. 6 is a diagram illustrating an example of resource mapping of the PDCCH.

FIG. 6 is a diagram illustrating an example of resource mapping of the PDCCH.

Referring to FIG. 6, RO denotes a reference signal of a first antennal, R1 denotes a reference signal of a second antenna, R2 denotes a reference signal of a third antenna, and R3 denotes a reference signal of a fourth antenna.

The control region within one subframe includes a plurality of CCEs. The CCE is a logical assignment unit used to provide a code rate according to the status of a radio channel to the PDCCH, and corresponds to a plurality of REGs. The REG includes a plurality of REs. The format of the PDCCH and the number of available bits of the PDCCH are determined according to the correlation between the number of CCEs and the code rate provided by the CCEs.

One REG (designated by a quadruplet in this figure) includes four REs, and one CCE includes nine REGs. To constitute one PDCCH, {1, 2, 4, 8} CCEs may be used, and each of the {1, 2, 4, 8} CCEs is called as a CCE aggregation level.

The control channel configured with one or more CCEs performs interleaving in the unit of REG, and is mapped to a physical resource after the cyclic shift based on a cell ID is performed.

Figure 7:
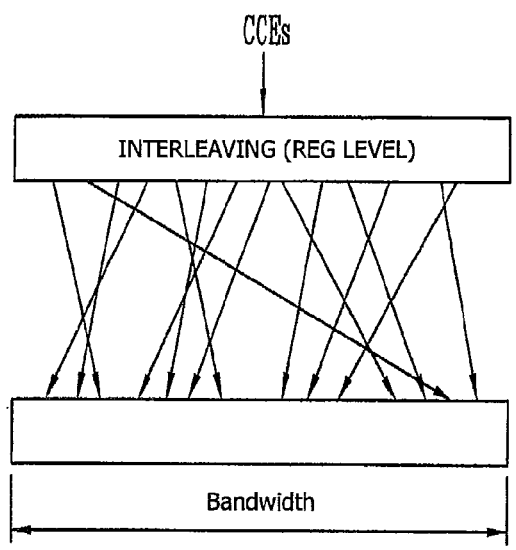
FIG. 7 is a diagram illustrating control channel element (CCE) interleaving in a system band.

FIG. 7 illustrates an example of interleaving CCEs in a system band.

Referring to FIG. 7, a plurality of logically consecutive CCEs are input as an interleaver. The interleaver functions to mix the input CCEs in the unit of REG.

Thus, frequency/time resources constituting one CCE are physically distributed in the entire frequency/time domain within the control region of the subframe. Although the control channel is configured in the unit of CCE, the interleaving is performed in the unit of REG, so that it is possible to maximize frequency diversity and interference randomization.

Figure 8:
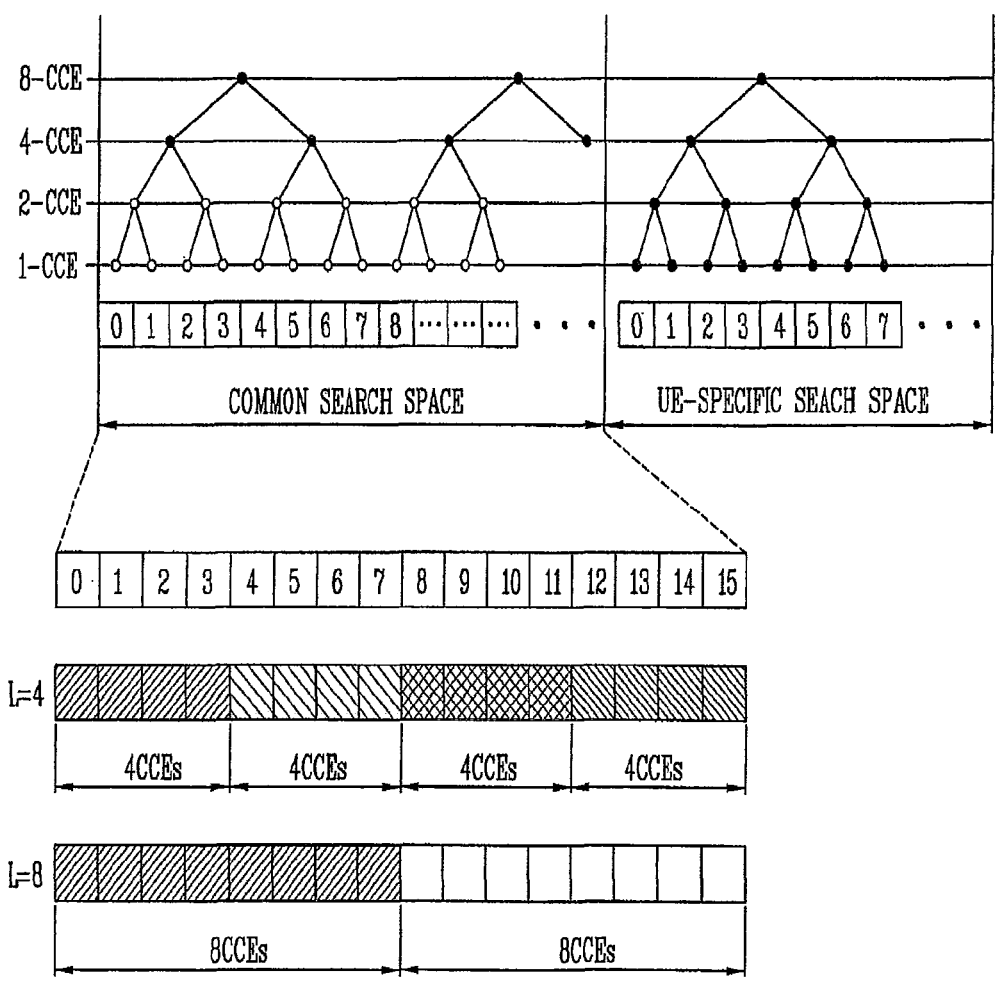
FIG. 8 is an exemplary diagram illustrating monitoring of the PDCCH.

FIG. 8 is an exemplary diagram illustrating monitoring of the PDCCH.

Blind decoding for PDCCH detection is used in the 3GPP LTE system. The blind decoding is a scheme of demasking a desired identifier to the CRC of a received PDCCH (this is referred to as a PDCCH candidate) and identifying whether or not the corresponding PDCCH is its own control channel by checking a CRC error. The UE does not recognize at which position in the control region its own PDCCH is transmitted and with which CCE aggregation level or DCI format its own PDCCH is transmitted.

A plurality of PDCCHs may be transmitted within one subframe. The UE monitors a plurality of PDCCHs at every subframe. Here, the monitoring refers to decoding of the PDCCH tried according to the format of the PDCCH monitored by the UE.

In the 3GPP LTE system, a search space is used to reduce the load caused by the blind decoding. The search space may be called as a monitoring set of CCEs for PDCCHs. The UE monitors PDCCHs in the corresponding search space.

The search space is divided into a common search space and a UE-specific search space. The common search space is a space for searching for PDCCHs having common control information. The common search space consists of 16 CCEs having CCE indices of 0 to 15, and support PDCCHs having CCE aggregation levels of {4, 8}. However, PDCCHs (DCI formats 0 and 1A) carrying UE-specific information may also be transmitted in the common search space. The UE-specific search space supports PDCCHs having CCE aggregation levels of {1, 2, 4, 8}.

The following Table 4 shows the number of PDCCH candidates monitored by the UE.

TABLE 4

| Search Space Type | Aggregation Level L | Size (in CCEs) | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of the search space is determined by Table 4, and starts points of the common search space and the UE-specific search space are defined different from each other in the search space. The start point of the common search space may be changed for each subframe depending on a UE identifier (e.g., C-RNTI), a CCE aggregation level and/or a slot number in the radio frame. When the start point of the UE-specific search space exists within the common search space, the UE-specific search space and the common search space may be overlapped with each other.

A search space $S^{(L)}_k$ at the aggregation level $L \in \{1,2,3,4\}$ is defined as a set of PDCCH candidates. The CCE corresponding to a PDCCH candidate m of the search space $S^{(L)}_k$ is given as follows.

$$L \cdot \{(Y_k+m) \mod \lfloor N_{CCE,k}/L \rfloor\}+i \qquad \text{Expression 1}$$

Here, $i=0, 1, \ldots, L-1$ and $m=0, \ldots, M^{(L)}-1$, $N_{CCE,k}$ denote the total number of CCEs that can be used in the transmission of PDCCH in a control region of a subframe k. The control region includes an aggregation of CCEs numbered by 0 to $N_{CCE,k}-1$. $M^{(L)}$ denotes the number of PDCCH candidates at the CCE aggregation level L in a given search space. In the common search space, $Y_k$ is set to 0 with respect to two aggregation levels i.e., L=4 and L=8. In the UE-specific search space, $Y_k$ is defined as follows.

$$Y_k = (A \cdot Y_{k-1}) \mod D \qquad \text{Expression 2}$$

Here, $Y_{-1} = n_{RNTI} \neq 0$, A=39827, D=65537, k=floor($n_s/2$), and $n_s$ denotes a slot number in the radio frame.

When the UE monitors PDCCHs using the C-RNTI, the DCI format and search space to be monitored are determined according to the transmission mode of PDSCH.

The following Table 5 shows an example of PDCCH monitoring in which C-RNTI is set.

TABLE 5

| Transmission Mode | DCI Format | Search Space | Transmission Mode of PDSCH according to PDCCH |
|---|---|---|---|
| Mode 1 | DCI format 1A | Common & UE-specific | Single antenna part, Port 0 |
| | DCI format 1 | UE-specific | Single antenna part, port 0 |
| Mode 2 | DCI format 1A | Common & UE-specific | Transmit diversity |
| | DCI format 1 | UE-specific | Transmit diversity |
| Mode 3 | DCI format 1A | Common & UE-specific | Transmit diversity |
| | DCI format 2A | UE-specific | Cyclic delay diversity (CDD) or transmit diversity |
| Mode 4 | DCI format 1A | Common & UE-specific | Transmit diversity |
| | DCI format 2 | UE-specific | Closed-loop spatial multiplexing |
| Mode 5 | DCI format 1A | Common & UE-specific | Transmit diversity |
| | DCI format 1D | UE-specific | Multi-user multiple input multiple output (MU-MIMO) |

TABLE 5-continued

| Transmission Mode | DCI Format | Search Space | Transmission Mode of PDSCH according to PDCCH |
|---|---|---|---|
| Mode 6 | DCI format 1A | Common & UE-specific | Transmit diversity |
|  | DCI format 1B | UE-specific | Closed-loop spatial multiplexing |
| Mode 7 | DCI format 1A | Common & UE-specific | If number of PBCH transmit ports is 1, single antenna port, and otherwise, transmit diversity |
|  | DCI format 1 | UE-specific | Single antenna part, Port 5 |
| Mode 8 | DCI format 1A | Common & UE-specific | If number of PBCH transmit ports is 1, single antenna port, and otherwise, transmit diversity |
|  | DCI format 2B | UE-specific | Dual layer transmission (port 7 or 8), or single antenna port, port 7 or 8 |

Hereinafter, a multiple carrier system will be described.

Although the 3GPP LTE system supports a case in which the bandwidths of DL and UL are set different from each other, this sets forth one component carrier (CC).

This means that only the case in which the bandwidths of the DL and UL are identical to or different from each other is supported under the situation in which one CC is defined with respect to each of the DL and UL. For example, the 3GPP LTE system supports a maximum of 20 MHz. Although the bandwidths of the DL and UL are different from each other, the 3GPP LTE system supports one CC with respect to each of the DL and UL.

Spectrum aggregation (bandwidth aggregation or carrier aggregation) is to support a plurality of CCs. The spectrum aggregation is introduced to support an increased throughput, to prevent an increase in cost due to the introduction of a RF element and to ensure compatibility with existing systems. For example, if five CCs are assigned as the granularity of a carrier unit having a bandwidth of 20 MHz, the 3GPP LTE system can support a maximum bandwidth of 100 MHz.

The spectrum aggregation may be divided into contiguous spectrum aggregation performed between continuous carriers in the frequency domain and non-contiguous spectrum aggregation performed between discrete carriers. The number of CCs aggregated between the DL and UL may be set different from each other. The case in which the number of DL CCs is identical to that of UL CCs is referred to as symmetric aggregation, and the case in which the number of DL CCs is different from that of UL CCs is referred to as asymmetric aggregation.

The DL and UL CCs may be called together as a 'cell.' That is, the 'cell' may be used as a concept of a pair of DL CC and UL CC. Here, the 'cell' used herein must be distinguished from a 'cell' as a region covered by a generally used BS.

The sizes (i.e., bandwidth) of the CCs may be different from each other. For example, when five CCs are used for the configuration of a cell having a band of 70 MHz, the cell may be configured as 5 MHz carrier (CC #0)+20 MHz carrier (CC #1)+20 MHz carrier (CC #2)+20 MHz carrier (CC #3)+5 MHz carrier (CC #4).

Figure 9:
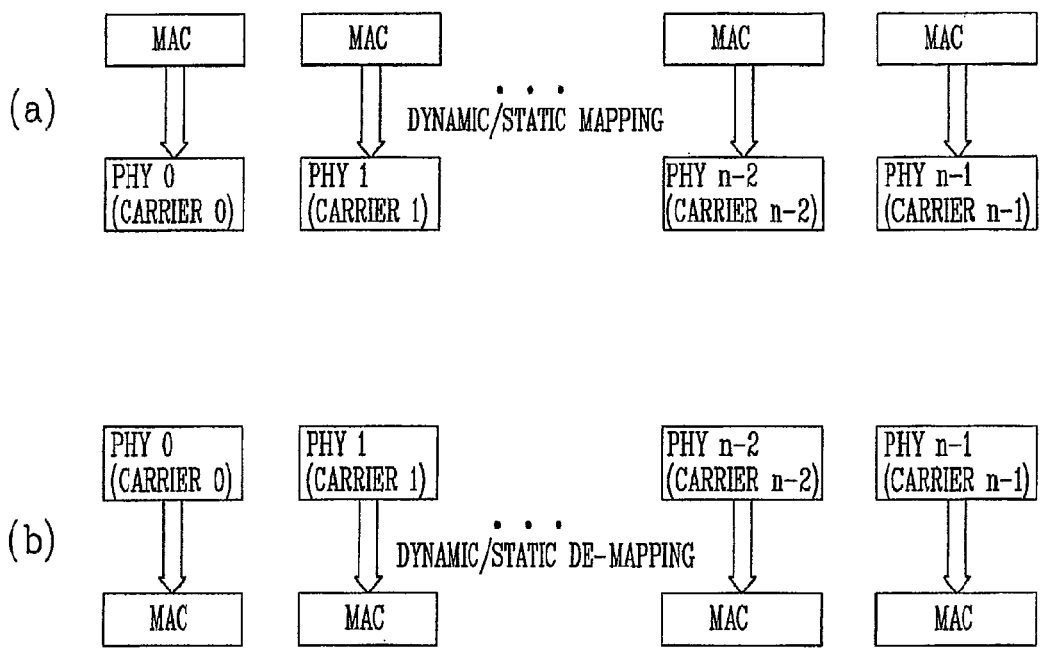
FIG. 9 (a) is a diagram illustrating a concept in which a plurality of media access controls (MACs) manage multiple carriers in a base station, and FIG. 9 (b) is a diagram illustrating a concept in which a plurality of MACs manage multiple carriers in a user equipment (UE)
Figure 10:
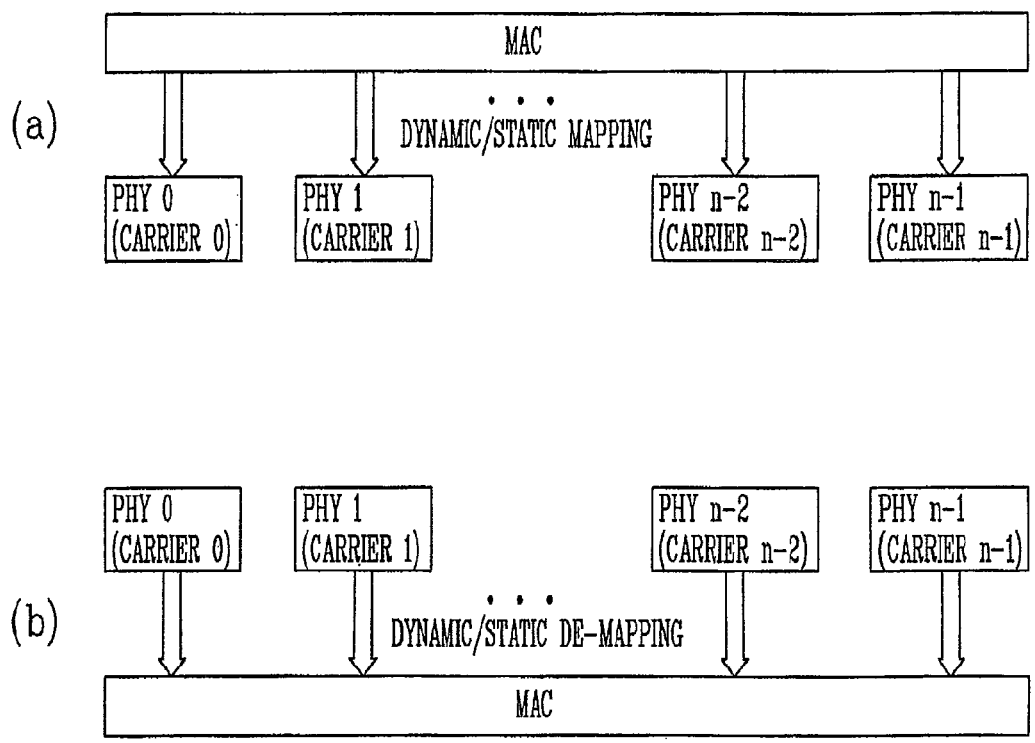
FIG. 10 (a) is a diagram illustrating a concept in which one MAC manages multiple carriers in a base station, and FIG. 10 (b) is a diagram illustrating a concept in which one MAC manages multiple carriers in the UE.

The configuration of a physical layer (PHY) and a layer 2 (MAC) for transmission in a plurality of UL or DL carrier bands assigned to an arbitrary cell or UE may be shown in FIGS. 9 and 10.

FIG. 9 (a) is a diagram illustrating a concept in which a plurality of media access controls (MACs) manage multiple carriers in a base station, and FIG. 9 (b) is a diagram illustrating a concept in which a plurality of MACs manage multiple carriers in a UE.

As shown in FIGS. 9 (a) and (b), MACs may control the carriers one by one, respectively. In a system supporting a plurality of carriers, each of the carriers may be used contiguous or non-contiguous. The carrier may be applied regardless of the UL/DL. A time division duplex (TDD) system is configured to operate N carriers including DL transmission and UL transmission within each of the carriers, and a frequency division duplex (FDD) is configured to use a plurality of carriers in each of the UL and DL. The FDD system may support asymmetric carrier combination in which the numbers and/or bandwidths of carriers combined in the UL and DL may support are different.

FIG. 10 (a) is a diagram illustrating a concept in which one MAC manages multiple carriers in a BS, and FIG. 10 (b) is a diagram illustrating a concept in which one MAC manages multiple carriers in the UE.

Referring to FIGS. 10 (a) and (b), one MAC performs transmission/reception by managing and operating one or more frequency carriers. Since it is unnecessary that the frequency carriers managed in the one MAC are contiguous to each other, it is further flexible in terms of the management of resources. In FIGS. 10 (a) and (b), one PHY means one component carrier for convenience of illustration. Here, the one PHY does not necessarily means an independent RF device. Although the independent RF device generally means one PHY, the present disclosure is not limited thereto, and one RF device may include several PHYs.

A series of PDCCHs transmitting control information of L1/L2 control signaling, generated from a packet scheduler of the MAC layer for supporting the configuration in the FIGS. 10 (a) and (b), may be transmitted by being mapped to physical resources in an individual component carrier.

Particularly, the PDCCH for channel assignment related to unique PDSCH or PUSCH transmission of an individual UE or control information related to grant may be generated as PDCCH encoded for each component carrier transmitted through a corresponding physical sharing channel. The generated PDCCH is called as a separate coded PDCCH. In another manner, control information for physical sharing channel transmission of several carrier components may be configured as one PDCCH to be transmitted. The PDCCH is called as a joint coded PDCCH.

To support the DL or UL carrier combination, the BS may configure connection so that the PDCCH and/or PDSCH for performing control information and data transmission suitable for a unique situation fore each specific UE or relay is transmitted, or may assign component carriers that become targets of measurement and/or reporting as a preliminary procedure of performing connection configuration for the transmission of the PDCCH and/or PDSCH. The assignment is called as component carrier assignment according to an arbitrary purpose.

In case where component carrier assignment information is controlled in L3 radio resource management (RRM), the BS may transmit the PDCCHs through unique RRC signaling (UE-specific or relay-specific RRC signaling) of a series of UEs or relays according to control dynamic characteristics, or may transmit the PDCCHs through L1/L2 signals or a series of dedicated physical channels for the transmission of only the control information.

Figure 11:
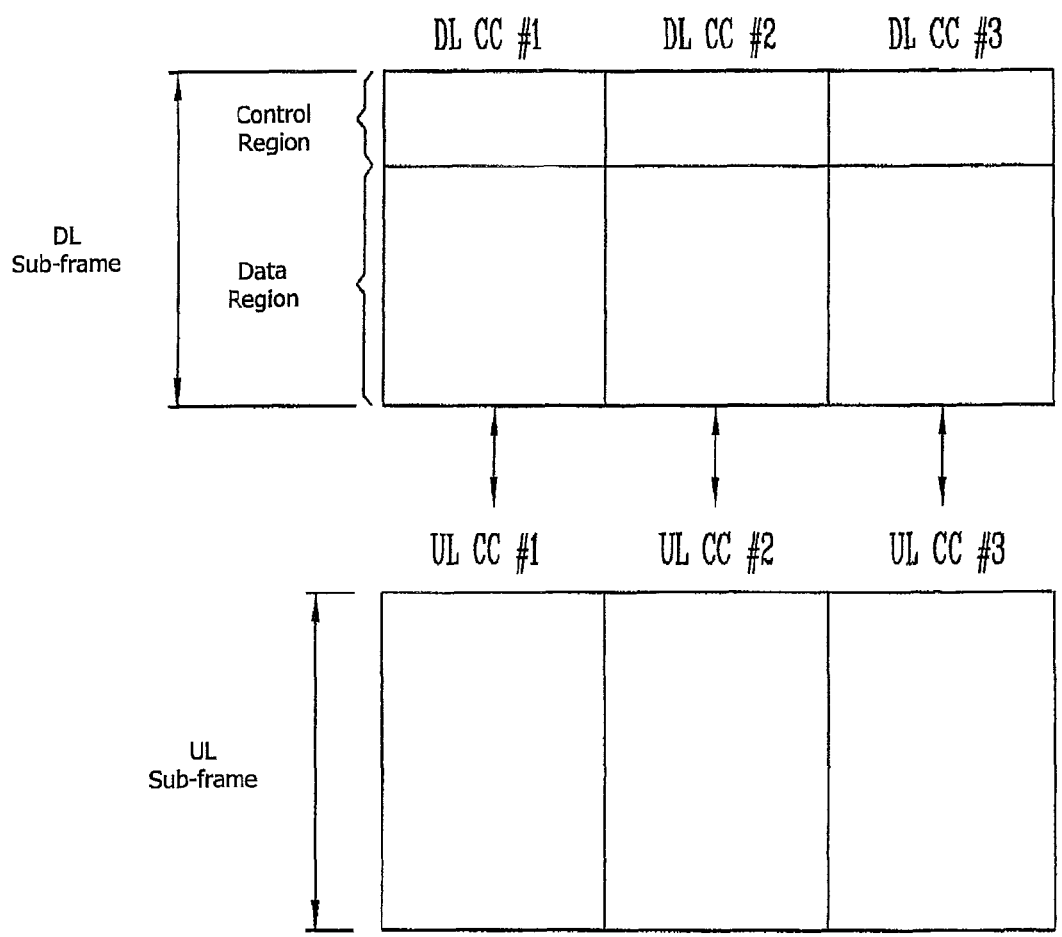
FIG. 11 is a diagram illustrating an example of multiple carriers.

FIG. 11 is a diagram illustrating an example of the multiple carriers.

Although the number of each of the DL CCs and UL CCs is three, the present disclosure is not limited to the number of DL CCs and UL CCs. PDCCH and PDSCH are independently transmitted in each of the DL CCs, and PUCCH and PUSCH are independently transmitted in each of the DL CCs.

Hereinafter, the multiple carrier system, as described above, refers to a system that supports multiple carriers based on the spectrum aggregation.

The contiguous spectrum aggregation and/or non-contiguous spectrum aggregation may be used in the multiple carrier system, and any one of the symmetric aggregation and asymmetric aggregation may be used in the multiple carrier system.

In the multiple carrier system, the linkage between the DL CC and UL CC may be defined. The linkage may be configured through EARFCN information contained in DL system information. The linkage is configured using a fixed DL/UL Tx/Rx separation relationship. The linkage refers to a mapping relationship between the DL CC through which PDCCH carrying UL grant is transmitted and the UL CC using the UL grant.

Alternatively, the linkage may be a mapping relationship between the DL CC (or UL CC) through which data for HARQ is transmitted and the UL CC (or DL CC) through which HARQ ACK/NACK signal is transmitted. The BS may transmit linkage information to the UE as a high-level layer message such as an RRC message or a portion of system information. The linkage between the DL CC and UL CC may be fixed, but may be changed into the linkage between cells/UEs.

The separate-coded PDCCH means that one PDCCH can carry control information such as resource assignment for PDSCH/PUSCH with respect to one carrier. That is, the PDCCH and PDSCH correspond to each other, and the PDCCH and PUSCH corresponds to each other.

The joint-coded PDCCH means that one PDCCH that can carry control information such as resource assignment for PDSCH/PUSCH of a plurality of CCs. The one PDCCH may be transmitted through one CC or may be transmitted through a plurality of CCs.

Hereinafter, although an example of division coding based on PDSCH-PDSCH that is a DL channel for convenience of illustration, this may also be applied to the relationship between PDCCH and PUSCH.

In the multiple carrier system, the CC scheduling may be implemented using two methods.

In a first method, a PDCCH-PDSCH pair is transmitted through one CC. The CC is referred to as a self-scheduling CC. The self-scheduling CC means that the UL CC through which the PUSCH is transmitted becomes a CC linked to the DL CC through which the corresponding PDCCH is transmitted.

That is, the PDCCH assigns PDSCH resources on the same CC or assigns PUSCH resources on the linked UL CC.

In a second method, the DL CC through which the PDSCH is transmitted or UL CC through which the PUSCH is transmitted is determined regardless of the DL CC through which the PDCCH is transmitted. That is, The PDCCH and PDSCH are transmitted through different DL CCs from each other, or the PUSCH is transmitted through the UL CC not linked with the DL CC through which the PDCCH is transmitted. This is referred to as cross-carrier scheduling.

The CC through which the PDCCH is transmitted may be called as a PDCCH carrier, monitoring carrier or scheduling carrier. The CC through which the PDSCH/PUSCH is transmitted may be called as a PDSCH/PUSCH carrier or scheduled carrier.

The cross-carrier scheduling may be activated/non-activated for each UE, and the UE activated by the cross-carrier scheduling may receive DCI containing CIF. The UE can recognize on which scheduled CC the PDCCH received from the CIF contained in the DCI is control information.

The DL-UL linkage predetermined by the cross-carrier scheduling may be overridden. That is, the cross-carrier scheduling is not performed on the linked CC but performed on another CC, regardless of the DL-UL linkage.

Figure 12:
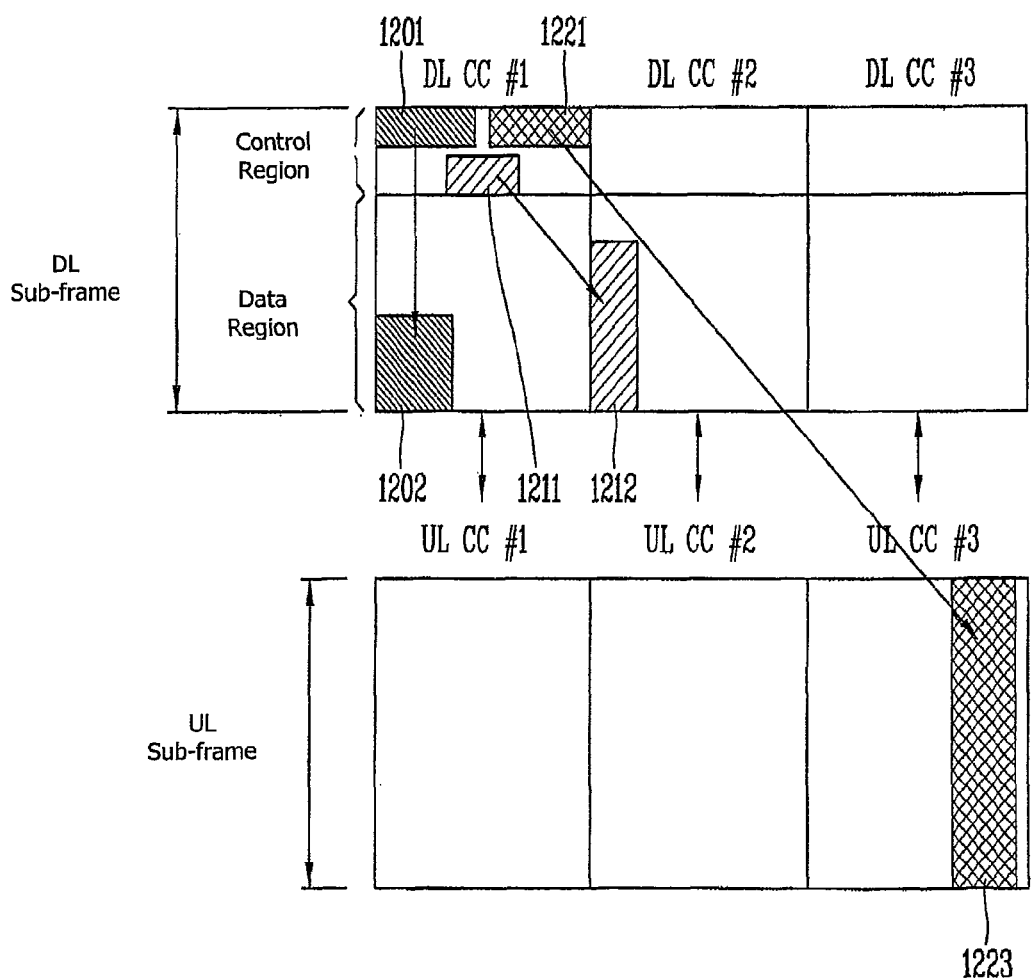
FIG. 12 is a diagram illustrating an example of cross-carrier scheduling.

FIG. 12 is a diagram illustrating an example of the cross-carrier scheduling.

It is assumed that DL CC #1 and UL CC #1 are linked with each other, DL CC #2 and UL CC #2 are linked with each other, and DL CC #3 and UL CC #3 are linked with each other.

A first PDCCH 1201 of the DL CC #1 carries DCI for a PDSCH 1202 of the same DL CC #1. A second PDCCH 1211 of the DL CC #1 carries DCI for a PDSCH 1212 of the DL CC #2. A third PDCCH 1221 of the DL CC #1 carries DCI for a PUSCH 1222 of the UL CC #3 not linked with the DL CC #1.

To perform the cross-carrier scheduling, the DCI of the PDCCH may include a carrier indicator field (CIF). The CIF indicates the DL CC or UL CC scheduled through the DCI. For example, the second PDCCH 1211 may include a CIF indicating the DL CC #2. The third PDCCH 1221 may include a CIF indicating the UL CC #3.

Alternatively, the CIF of the third PDCCH 1221 does not indicate the value of the CIF corresponding to the UL CC but may indicate the value of the CIF corresponding to the DL CC.

That is, the CIF of the third PDCCH 1221 indicates the DL CC #3 linked with the UL CC #3, so as to indirectly indicate the UL CC #3 scheduled by the PUSCH. If the DCI of the PDCCH includes PUSCH scheduling and CIF indicates the DL CC, the UE can determine that the PUSCH scheduling is PUSCH scheduling on the UL CC linked with the DL CC. Accordingly, it is possible to indicate a larger number of CCs as compared with the method of indicating all DL/UL CCs using a CIF having a limited bit length (e.g., CIF having a length of 3 bits).

The UE using the cross-carrier scheduling necessarily monitors PDCCHs of a plurality of scheduled CCs with respect to the same DCI format in the control region of one scheduled CC. For example, if the transmission modes of the plurality of DL CCs are different from one another, the UE may monitor a plurality of PDCCHs with respect to different DCI format in each of the DL CCs. If the bandwidths of the DL CCs are different from one another even though the same transmission mode is used, the sizes of payloads the same DCI format are different from one another, and therefore, the UE may monitor a plurality of PDCCHs.

Consequently, when the cross-carrier scheduling is possible, the UE necessarily monitor PDCCHs for a plurality of DCI in the control region of a monitoring CC according to the transmission mode and/or bandwidth for each CC. Thus, to support this, there is required the configuration of a search space and PDCCH monitoring.

First, in the multiple carrier system, the following terms are defined.

UE DL CC set refers to a set of DL CCs scheduled for the UE to receive PDCCH.

UE UL CC set refers to a set of UL CCs scheduled for the UE to transmit PUSCH.

PDCCH monitoring set refers to at least one set of DL CCs, which performs PDCCH monitoring. The PDCCH monitoring set may be the same as the UE DL CC set or may be a subset of the UE DL CC set. The PDCCH monitoring set may include at least one of DL CCs within the UE DL CC set. Alternatively, the PDCCH monitoring set may be separately defined regardless of the UE DL CC set. The UL CCs included in the PDCCH monitoring set may be set so that the self-scheduling for linked UL CCs is always possible.

The UE DL CC set, the UE UL CC set and the PDCCH monitoring set may be configured as cell-specific or UE-specific sets.

Figure 13:
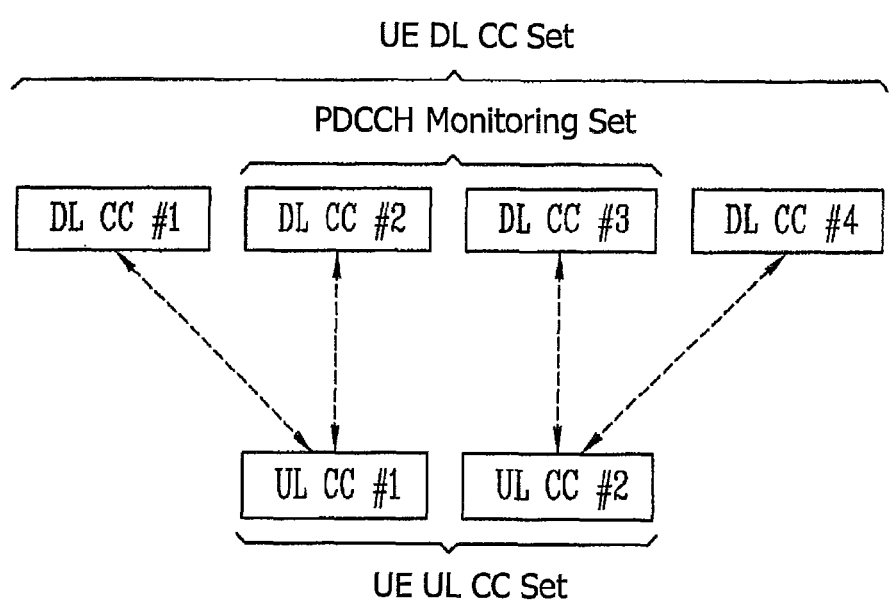
FIG. 13 is a diagram illustrating an example of a component carrier (CC) set.

FIG. 13 illustrates an example of the CC set. It is assumed that four CL CCs (DL CC #1, #2, #3 and #4) as the UE DL CC set, two UL CCs (UL CC #1 and #2) as the UE UL CC set, and two DL CCs (DL CC #2 and #3) as the PDCCH monitoring set are assigned to the UE.

The DL CC #2 in the PDCCH monitoring set transmits PDCCH for PDSCH of the DL CC #1/#2 in the UE UL CC set. The DL CC #3 in the PDCCH monitoring set transmits PDCCH for PDSCH of the DL CC #3/#4 in the UE DL CC set and PDCCH for PUSCH of the UL CC #2 in the UE UL CC set.

The linkage between CCs included in the UE DL CC set, the UE UL CC set and the PDCCH monitoring set may be configured. In the example of FIG. 13, the PDCCH-PDSCH linkage is configured between the DL CC #2 that is a scheduling CC and the DL CC #1 that is a scheduled CC, and the PDCCH-PUSCH linkage is configured between the DL CC #2 and the UL CC #1 is configured. The PDCCH-PDSCH linkage is configured between the DL CC #3 that is a scheduling CC and the DL CC #4 that is a scheduled CC, and the PDCCH-PUSCH linkage is configured between the DL CC #3 and the UL CC #2. The BS may inform the UE of information on the scheduling CC or information on the PDCCH-PDSCH/PUSCH linkage through cell-specific signaling or UE-specific signaling.

Alternatively, both the DL CC and UL CC may not be linked with each other with respect to each of the DL CCs in the PDCCH monitoring set. After the DL CC in the PDCCH monitoring set and the DL CC in the UE DL CC set are linked with each other, the UL CC for PUSCH transmission may be limited to the UL CC linked with the DL CC in the UE DL CC set.

CIFs may be set different from one another according to the linkage of the UE DL CC set, the UE UL CC set and the PDCCH monitoring set.

Hereinafter, a method of interpreting a CIF when the UE having activated cross-carrier scheduling receives the CIF from the BS according to an embodiment of the present disclosure will be described.

Before describing the method of interpreting the CIF according to the embodiment of the present disclosure, a cell-specific CIF configuration method and a UE-specific CIF configuration method will be described in brief.

FIG. 14 is a diagram illustrating a CIF configuration method.

Figure 14A:
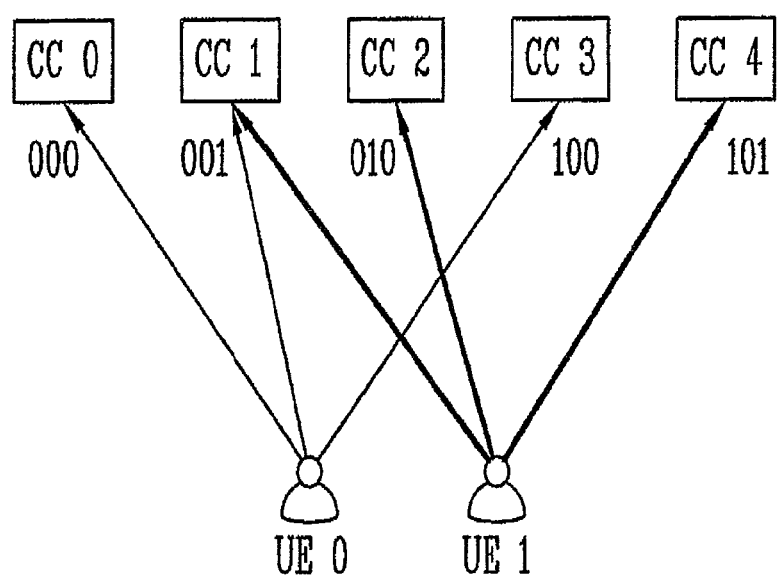
FIG. 14 (a) is a diagram illustrating a cell-specific carrier indicator field (CIF) configuration method.
Figure 14B:
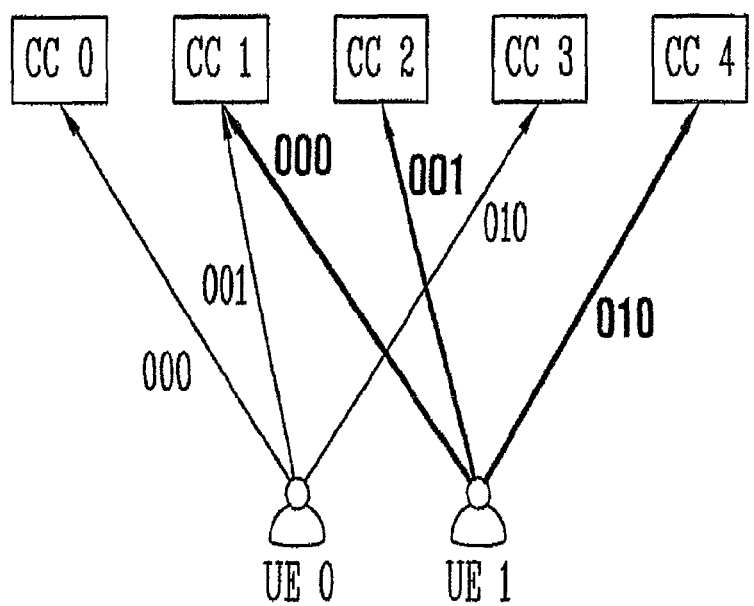

FIG. 14(a) is a diagram illustrating a cell-specific carrier indicator field (CIF) configuration method. FIG. 14(b) is a diagram illustrating a UE-specific CIF configuration method according to an embodiment of the present disclosure.

As shown in FIG. 14 (a), in the cell-specific CIF method, all CCs configured in a specific cell are indexed, and the indexed values corresponding to the CCs are indicated to UEs, respectively.

Referring to FIG. 14 (a), when the CCs configured in the cell are five CCs, i.e., CC0 to CC4, the CCs are indexed as '000,' '001,' '010,' '100' and '101,' respectively, and the indexed values are indicated to the UE through the CIF.

While the CIF is fixed to 3 bits, cell deployment may be performed on one cell using eight or more CCs that can be expressed by 3 bits. Thus, the cell-specific CIF indexing has an advantage in that unified indexing is used in all the UEs. However, all the UEs cannot be appropriately scheduled using only the 3-bit CIF according to cell configuration.

As shown in FIG. 14 (b), in the UE-specific CIF configuration method, CCs are indexed according to the CC configuration assigned to each UE, and the corresponding indexed value is indicated to the UE through the CIF.

Referring to FIG. 14 (b), the CCs assigned to UE 0 are configured as CC0, CC1 and CC3, and the CCs assigned to UE 1 are configured as CC1, CC2 and CC4.

Thus, the BS indexes the CC0, CC1 and CC3 for the UE 0 as '000,' '001' and '010,' respectively, and the indexed values are indicated to the UE 0 through the CIF. The BS indexes the CC1, CC2 and CC4 for the UE 1 as '000,' '001' and '010,' respectively, and the indexed values are indicated to the UE 1 through the CIF.

Hereinafter, a method of interpreting a CIF when the UE receives the CIF from the BS in the UE-specific CIF configuration method will be described in detail.

Method 1: DL/UL Independent CIF Assignment

In the method 1, 3-bit CIFs are assigned to DL grants for DL CCs, respectively, and 3-bit CIFs are assigned to UL grants for UL CCs, respectively. Since DCI format 0 that is a UL grant DCI format of a LTE (Rel-8) system has the same size as DCI formation 1A that is a DL grant DCI format, a flag corresponding to 1 bit is added so as to distinguish the DL grant from the UL grant.

That is, in case where eight states that can be expressed by 3 bits in {000 to 111} are independently used in the DL/UL, the DL grant cannot be distinguished from the UL grant through only the CIF in the DCI format. Hence, a flag for distinguishing the DL grant from the UL grant is added.

Method 2: Implicit UL CIF Assignment

The method 2 is a method in which an independent CIF is not transmitted to the UL grant for the UL CC.

(1) In case where the cross-carrier scheduling is to be performed on the UL grant, the UE has activated cross-carrier scheduling. In case where a UL grant is received, the UE automatically recognizes that the received UL grant is a grant for a UL CC linked with the DL CC receiving the UL grant, and transmits data to the corresponding UL CC linked with the DL CC.

(2) The indexing in which a CIF transmitted by adding a UL grant actually performs indication is transmitted as indexing for the DL CC. The UE reads the corresponding CIF, automatically recognizes that the UL grant is a grant for a UL CC linked with the DL CC indicated by the CIF, and transmits data to the corresponding UL CC. Here, the UE can recognize that the DCI received from the BS is a DL grant or UL grant through the size of the DCI format.

Method 3: DL/UL Combined CIF Assignment

The method 3 is a method the DL/UL grants shares 3-bit CIFs, i.e., eight states of {000, 001, 010, 011, 100, 101, 110, 111}. As an example, the five states of {000 to 100} are used for the DL CC, and the other three states are used for the UL CC.

The DL CC and UL CC may be used by fixing states that can be used by each of the DL/UL. However, CIFs may be variably interpreted according to the assignment state of the UE.

As an example, when assuming that four DL CCs and two UL CCs are assigned to UE A, the four states of 000 to 011 may be used to indicate the DL CCs, and the two states of 100 and 101 may be used to indicate the UL CCs. In the method described above, the DL grant can be distinguished from the UL grant according to the state of the CIF, and hence it is unnecessary to add a flag for distinguishing the DL grant from the UL grant.

The DL/UL DCI mode indicator preferably exists at a fixed position. However, as defined in the Rel-8 LTE system, the same position as that at which the DCI format indicator exists in the DCI formats 0 and 1A is preferably determined as the position of the mode indicator. Accordingly, the DCI DL mode can be distinguished from the DCI UL mode at the fixed position regardless of the DCI mode.

When the DL/UL CC configuration in the hybrid form of the methods 1 to 3 is within the range that can be expressed by the 3-bit CIF (i.e., when the total number of DL/UL CCs assigned to an arbitrary UE does not exceed 8), the method 3 may be used. When the DL/UL CC configuration is out of the range that can be expressed by the 3-bit CIF (i.e., when the total number of DL/UL CCs assigned to an arbitrary UE exceeds 8), the methods 1 and 2 may be used.

That is, the method of varying CIF interpretation according to the DL/UL CC configuration of the UE may be used.

Cases in which the CIF is changed depending on the CC configuration of the UE may be as follows.

1. The change in the interpretation method of CIF may consider a change in the mapping relationship between CIF and DL/UL CCs as described above. For example, it is assumed that CC is indicated using a 3-bit CIF. When the total number of DL CCs and UL CCs cannot be expressed by a state allowed to perform CC indexing in 3 bits, the UE may perform independent indexing on the DL CC and UL CC, and include an indicator specifying a DCI format. On the contrary, when the total number of DL CCs and UL CCs can be expressed by a state allowed to perform CC indexing in 3 bits, the UE performs indexing by mixing the DL/UL CCs, so that DL DCI can be distinguished from the UL DCI using only the value of CIF. In this case, the DL/UL DCI mode indicators may not be included. The presence of existence of the DL/UL DCI mode indicators may be implicitly determined according to the CC configuration of the UE, but may be explicitly determined as UE-specific dedicated signaling together with the CC configuration.

The determination reference may be changed depending on the UE-specific CC configuration, but may be determined according to the system-specific CC configuration. That is, the interpretation method changed by the UE may be automatically configured according the total number of CCs existing in the system.

2. The mapping meaning of CIF may be changed depending on the total number of carriers used in the system. In this case, the meaning may become a reference of the mapping method of CIF, i.e., the method of applying the UE-specific interpretation or selecting the cell-specific (system-specific) interpretation.

That is, when the number of CCs existing in the system can be expressed by an allowable state of CIF, the CIF is interpreted using the system-specific indexing. When the number of CCs existing in the system cannot be expressed by an allowable state of CIF, the CIF is interpreted using the UE-specific indexing. That is, the value indicated by the CIF is mapped to CC according to the UE-specific CC configuration.

The bit position occupied by the DCI format may be changed depending on the present of existence of the mode indicator. For example, when the DL DCI can be distinguished from the UL DCI through the CIF, the UE may remove the position that has been used as a mode indicator in the DCI format and read the bit field by concatenating the other fields. Alternatively, if the mode indicator is defined from the outside of DCI, the UE may read the DCI field by shifting the position to the position occupied by the mode indicator and mapping the bit field.

Figure 15:
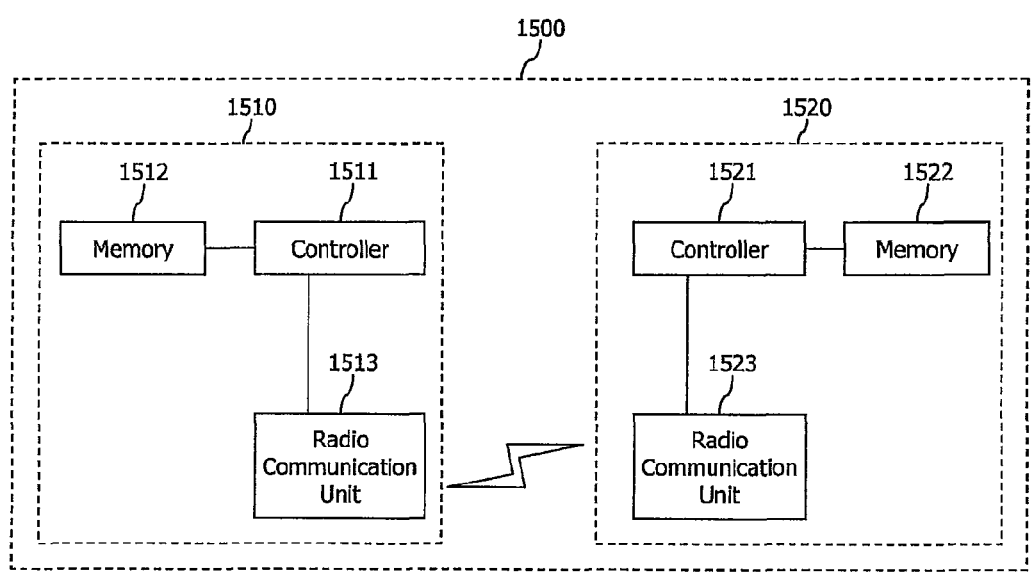
FIG. 15 is a block diagram illustrating a radio communication system according to an embodiment of the present disclosure.

FIG. 15 is a block diagram illustrating a radio communication system according to an embodiment of the present disclosure.

A BS 1510 includes a control unit 1511, a memory 1512 and a radio frequency (RF) unit 1513.

The control unit 1511 implements a proposed function, procedure and/or method. The layers of the radio interface protocol may be implemented by the control unit 1511.

The control unit 1511 may operate multiple carriers and configure CIFs.

The memory 1512 is connected to the control unit 1511 so as to store protocols or parameters for operating the multiple carriers. The RF unit 1513 is connected to the control unit 1511 so as to transmit and/or receive radio signals.

A UE 1520 includes a control unit 1521, a memory 1522 and an RF unit 1523.

The control unit 1521 implements a proposed function, procedure and/or method. The layers of the radio interface protocol may be implemented by the control unit 1521. The control unit 1521 may operate multiple carriers and use cross-carrier scheduling on the multiple carriers, based on CIFs.

The memory 1512 is connected to the control unit 1521 so as to store protocols or parameters for operating the multiple carriers. The RF unit 1521 is connected to the control unit 1521 so as to transmit and/or receive radio signals.

The control unit 1511 or 1521 may include an application-specific integrated circuit (ASIC), a chip set, a logical circuit and/or a data processing device. The memory 1512 or 1522 may include a read-only memory (ROM), a random access memory (RAM), a flash memory, a memory card, a storage medium and/or a storage device. The RF unit 1513 or 1523 may include a baseband circuit for processing a radio signal. When the embodiment is implemented using software, the aforementioned technique may be implemented using a module (process, function, etc.) performing the aforementioned functions. The module may be stored in the memory 1512 or 1522, and may be executed by the control unit 1511 or 1521. The memory 1512 or 1522 may exist inside or outside the control unit 1511 or 1521, and may be connected to the control unit 1511 or 1521 using various well-known means.

The scope of the present disclosure is not limited to the embodiments disclosed in this specification, and it will be understood by those skilled in the art that various changes and modifications can be made thereto within the technical spirit and scope defined by the appended claims.

The invention claimed is:

1. A method of transmitting a data burst by a user equipment (UE) through cross-carrier scheduling in a system supporting a plurality of component carriers, the method comprising:
receiving, by the UE from a base station (BS), downlink control information (DCI) containing a carrier indicator field (CIF) through a physical downlink control channel (PDCCH) in a control region within a subframe, the CIF identifying either a downlink component carrier or an uplink component carrier and the DCI further containing a flag which is one bit information and indicates that the DCI is for either a downlink resources assignment or an uplink grant,
wherein two or more component carriers among the plurality of component carriers are assigned to the UE and the two or more component carriers are indexed in a UE-specific manner such that indexes of component carriers assigned to different UEs can be different, and
wherein the CIF includes an indexed value of the downlink component carrier or the uplink component carrier;
transmitting, by the UE to the BS, an uplink data burst through the uplink component carrier identified by the CIF when the flag indicates that the DCI is for the uplink grant; and
receiving by the UE from the BS, a downlink data burst through the downlink component carrier identified by the CIF when the flag indicates that the DCI is for the downlink resources assignment.

2. The method of claim 1, wherein the DCI is for either a downlink scheduling assignment containing downlink resource assignment information or an uplink grant containing uplink resource assignment information.

3. The method of claim 1, wherein the CIF is expressed by 3 bits.

4. A user equipment (UE) configured to transmit a data burst through cross-carrier scheduling in a system supporting a plurality of component carriers, the UE comprising:
a radio frequency (RF) unit configured to transmit and receive radio signals; and
a control unit connected to the RF unit,
wherein the control unit is configured to:
control the RF unit to receive, from a base station (BS), downlink control information (DCI) containing a carrier indicator field (CIF) through a physical downlink control channel (PDCCH) in a control region within a subframe, the CIF identifying either a downlink component carrier or an uplink component carrier and the DCI further containing a flag which is one bit information and indicates that the DCI is for either a downlink resources assignment or an uplink grant,
wherein two or more component carriers among the plurality of component carriers are assigned to the UE and the two or more component carriers are indexed in a UE-specific manner such that indexes of component carriers assigned to different UEs can be different, and
wherein the CIF includes an indexed value of the downlink component carrier or the uplink component carrier;
control the RF unit to receive, from the BS, a downlink data burst through the downlink component carrier identified by the CIF when the flag indicates that the DCI is for the downlink resources assignment; and
control the RF unit to transmit, to the BS, an uplink data burst through the uplink component carrier identified by the CIF when the flag indicates that the DCI is for the uplink grant.

5. The UE of claim 4, wherein the DCI is for either a downlink scheduling assignment containing downlink resource assignment information or an uplink grant containing uplink resource assignment information.

6. The UE of claim 4, wherein the CIF is expressed by 3 bits.

* * * * *